Patented Oct. 24, 1922.

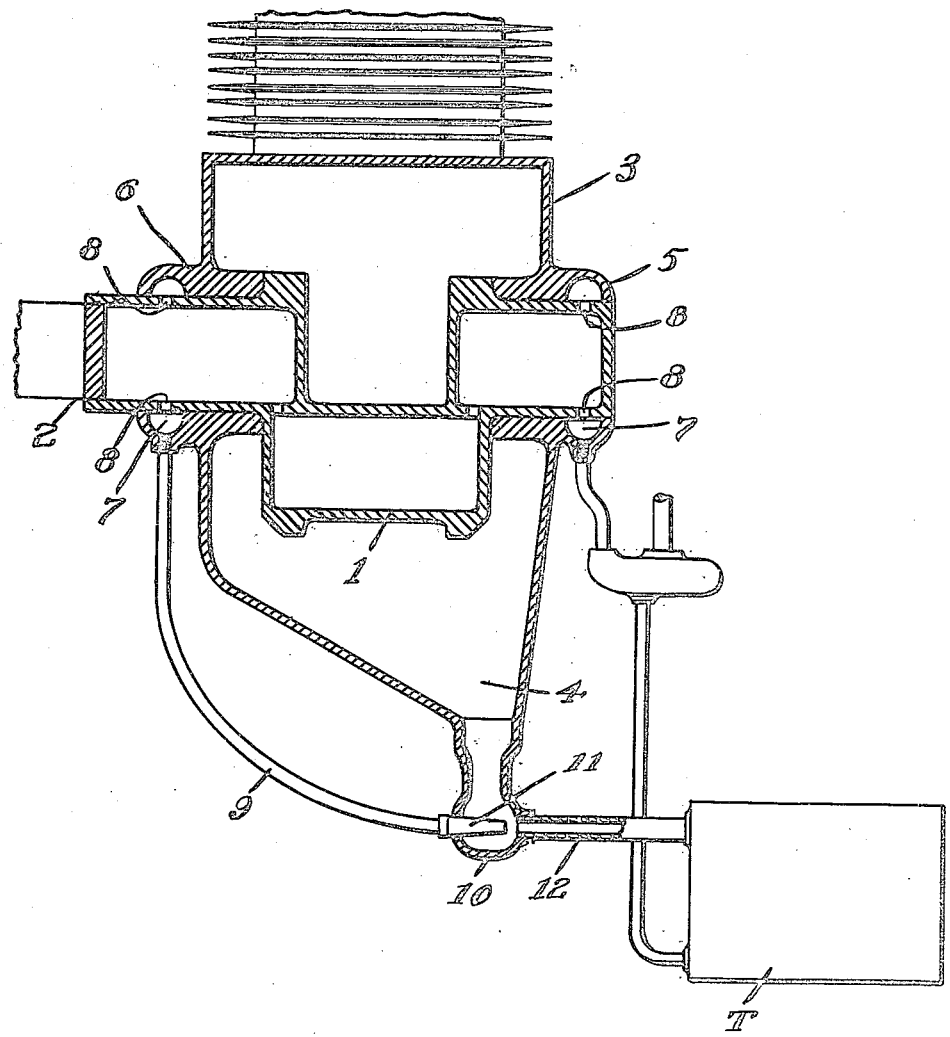

1,432,817

UNITED STATES PATENT OFFICE.

JOSEPH WERTZHEISER, OF NEW YORK, N. Y., ASSIGNOR TO LAWRANCE AERO ENGINE CORPORATION, A CORPORATION OF NEW YORK.

LUBRICATING SYSTEM FOR HIGH-SPEED ENGINES.

Application filed May 7, 1920. Serial No. 379,637.

*To all whom it may concern:*

Be it known that JOSEPH WERTZHEISER, a citizen of the United States, residing at 1155 Washington Ave., New York, New York, has invented certain new and useful Improvements in Lubricating Systems for High-Speed Engines, of which the following is a specification.

In my present invention I have provided for certain improvements in the lubrication of high speed motors and while not limited thereto is applicable to such a lubrication system as that shown in Letters Patent of the United States of Charles L. Lawrance #1,338,310 dated April 27, 1920.

In certain motors employing this hollow crank oiling and cooling system, the drainage of the sump is not always free and oil tends to accumulate therein to an undesirable extent. In accordance with my invention the sump may be kept drained and the oil promptly returned to the main body of the lubricant by the utilization of the excess oil coming from the crank under the pressure of the pump. For the purposes of disclosure and illustration I will set forth a simple installation for this purpose and in the drawings have shown a form of my invention which however is ample to illustrate the principle and operation of the invention in any form in which it may be applied. In these drawings and in the specification relative thereto like reference characters are employed to indicate corresponding parts.

The drawing represents somewhat diagrammatically in its single figure an engine crank, case and oil supply and distribution.

Referring to the drawings it will be seen that a hollow crank 1 is mounted on a shaft 2, the same being mounted in a crank case 3 drained by a sump 4.

The bearings 5 and 6 at each side of the crank case are each provided with an annular groove or chamber 7 which communicates with the interior of the hollow crank through vents or passages 8.

An excess of cool oil is pumped at all times from a tank T by means of a pump P driven by a shaft S.

Entering the shaft at the bearing 5 the oil flows through the crank pin section and escapes through the annular chamber 7 at the opposite side of the casing 3.

From here it flows under pressure back through the return pipe 9 entering the shell 10 in the form of an injector nozzle 11 delivering toward the tank pipe 12. As the sump 4 is open to the shell 10 the injective action of the nozzle 11 in this casing will draw constantly upon the sump 4 and this prevents any accumulation of oil therein.

Various modifications in the form and manner of the installation of my device may be made and my invention may be applied to a great variety of motors all without departing from the spirit thereof within the limits of the appended claims.

What I therefore claim and desire to secure by Letters Patent is:

1. In a high speed engine, a crank case having a sump, a hollow crank shaft, a chambered bearing for each end of said crank shaft and communicating with the interior of said shaft, an excess force feed oil supply to one of said bearings, a return connection from the chamber of the other bearing including an injector operating simultaneously in conjunction with said force feed supply and having draft connection with said sump.

2. In a high speed engine, a crank case having a sump, a hollow crank shaft having bearing in said case, a pump for circulating oil through said shaft, two of the main bearings for said shaft being constructed so that the oil may be forced into the hollow crank shaft through one bearing and out through the other bearing, and an injector operated by the forced out oil simultaneously in conjunction with said pump and having a draft on said sump.

3. In combination with an oil cooled crank shaft and a sump therefor, an oil supply source, means for circulating oil under pressure along said shaft from end to end thereof and for returning it to said supply source, and a sump drain including an injector operatively connected with the crank shaft circulation return system and operating simultaneously in conjunction with the forced feed circulating system.

4. In an engine, a forced feed excess oil supply circulation, a sump drain, and an injector having draft on said sump drain, and operatively connected with said forced feed circulation for simultaneous operation in conjunction with said forced feed oil circulator.

5. In an engine, a crank case having a sump, a hollow crank shaft mounted in said case, a bearing for said shaft at either side of said case, said bearings each having a chamber communicating directly with the interior of said shaft, an oil supply tank, a pump connected therewith, a feed pipe leading from said pump to the chamber of said bearings, a return pipe leading from the chamber of the other bearing to the drain outlet of the sump, and having an injector disposed in said outlet, and a connection from said outlet to the supply tank.

6. In a lubricating system, a force feed oil circulation supply to the part to be lubricated, a sump drain, a return conduit, and an injector included in said return conduit and having draft upon said sump and operating simultaneously in conjunction with said force feed oil circulator.

In testimony whereof he had affixed his signature in presence of two witnesses.

JOSEPH WERTZHEISER.

Witnesses:
HERMAN B. RING,
HARRY E. RADACK.